Feb. 22, 1955   J. G. TAYLOR   2,702,843
PROPORTIONAL-TIME TEMPERATURE CONTROLLER
Filed Aug. 18, 1953
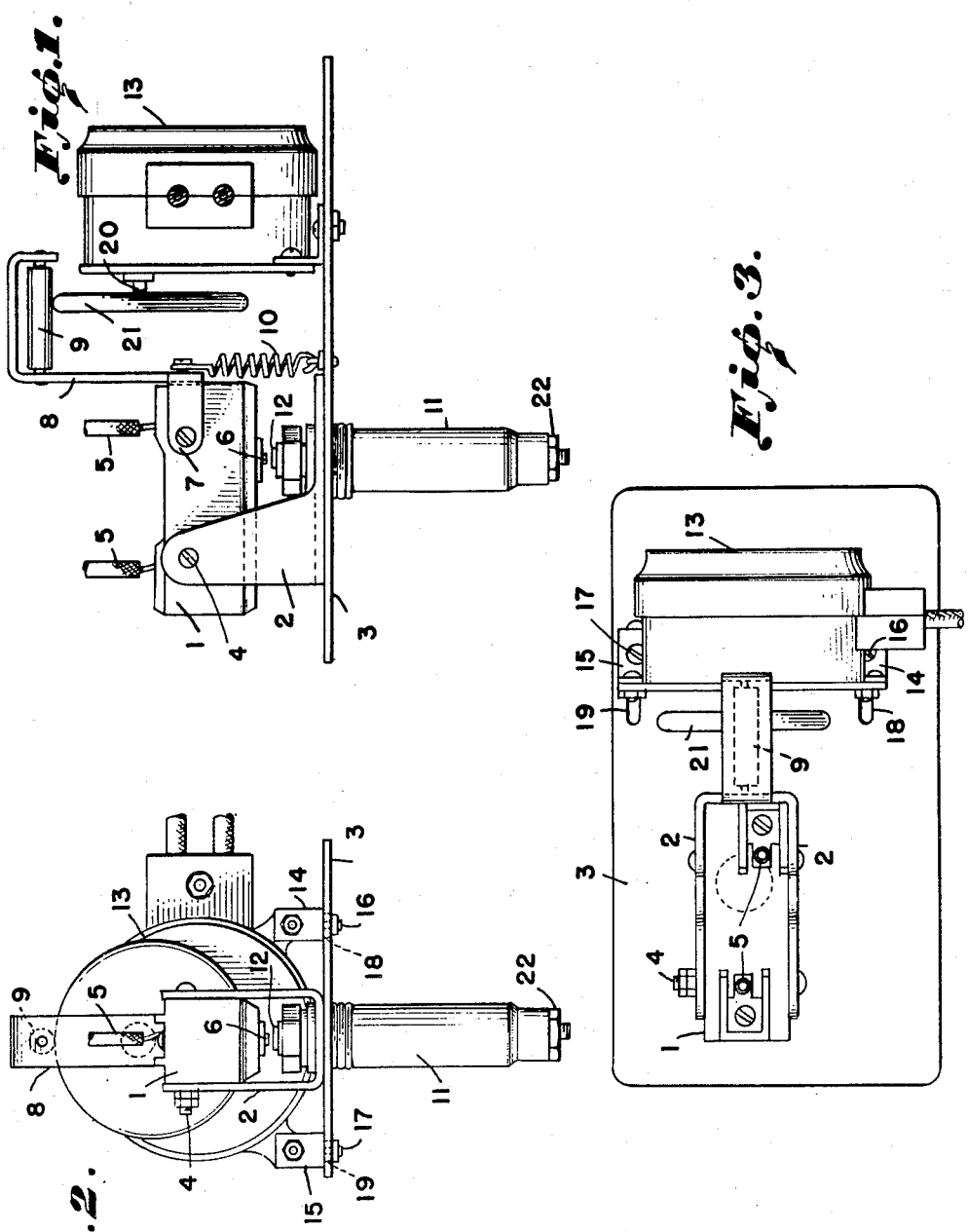
INVENTOR
J. G. TAYLOR
BY J. A. Seegrist
R. Hoffman
ATTORNEYS

United States Patent Office 2,702,843
Patented Feb. 22, 1955

2,702,843

PROPORTIONAL-TIME TEMPERATURE CONTROLLER

John G. Taylor, West Lafayette, Ind.; dedicated to the free use of the People in the territory of the United States Application August 18, 1953, Serial No. 375,082

3 Claims. (Cl. 200—136.3)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The invention herein described is hereby dedicated to the free use of the people in the territory of the United States.

This invention relates to a device for controlling the temperature of an operation or process.

In conventional apparatus employing heating units, automatic control of the temperature of the operation may be achieved by placing a heat-sensitive element at or near the site of operation, and then coupling this heat-sensitive element to the control mechanism of the heating unit. In this manner control of temperature is achieved by automatically turning the heater on when the temperature drops below the desired point, and by turning the heater off when the desired temperature is reached. However, due to the fact that the temperature continues to drop for a period after the heater is turned on and continues to rise for a period after the heater is turned off, temperatures of operations controlled by conventional thermostats are subject to wide fluctuations, often defeating the very purpose for which temperature control was provided.

It is an object of this invention to provide a device whereby temperatures can be so controlled as to minimize fluctuations.

Another object is to provide a device by means of which the proportion of the time "ON" to time "OFF" in a definite timing cycle may be controlled in relation to the temperature.

Other objects will become apparent from the description of the invention which follows and from the accompanying drawings.

In the drawings:

Figure 1 represents a side elevation of the device;

Figure 2 is an end view; and

Figure 3 represents a top view.

In detail, the device consists of a switch 1 mounted by means of bracket 2 on base plate 3. Switch 1 is pivotally mounted in bracket 2 by means of pivot 4. A pair of leads 5 connect the switch to whatever equipment, not shown, it is desired to control. Plunger 6 operates the switch to turn it on or off, depending on the normal position of the switch. As used in the present arrangement, the switch is in a normally closed position, although there may be processes where it may be desired to use a normally open switch. Secured to the switch casing by means of bolt 7 is a bracket 8 which carries cam follower 9. Spring 10, secured to both the base 3 and bracket 8 serves to draw the switch toward the base plate. Also mounted on the base plate in line with switch plunger 6 is a thermostat 11, which may have a direct or remote connected sensing bulb, not shown, and which is provided with a moving plunger 12. Also mounted on base plate 3 is an electrically operated clock motor 13. This motor is supported on brackets 14 and 15 which in turn are secured to the base plate by means of bolts 16 and 17 passing through slots 18 and 19 in the base plate. These slots provide for adjustability of the relative distances apart of the motor and switch. Motor 13 is provided with a shaft 20 on which is mounted cam 21. An adjustment nut 22 on thermostat 11 controls the length of thermostat plunger 12 which protrudes.

In operation, clock motor 13 operates continuously, causing attached cam 21 to turn. Cam follower 9 is held against the cam by means of spring 10, causing switch 1 to travel up and down through an arc whose center is at 4. Depending on the temperature, the thermostat plunger 12 may come in contact with switch plunger 6 during a portion of the switch movement. If the thermostat plunger 12 is fully extended due to high temperature it will depress switch plunger 6 and hold cam follower 9 above cam 21 for a full revolution of the latter, causing the contacts of the switch to remain open for the same period. As the temperature falls the thermostat plunger 12, holding switch 1 above cam 21, will retract until the cam holds the switch above plunger 12 for a portion of the cam cycle. During this portion of the cycle the switch contacts are closed, causing the controlled heating units, not shown, to start operating. If the temperature continues to decrease, the portion of the cycle during which the switch contacts are closed will increase, causing the controlled heating units to remain on longer. However, if the temperature increases, the portion of the cycle during which the switch contacts are closed will decrease, lowering the time during which the heat is turned on. In this manner, by having an intermittent operation during the timing cycle, it is possible to minimize the range of temperature fluctuation above and below the desired set temperature of whatever process is being carried out.

The adjusting screw 22 on thermostat 11 allows the plunger 12 to be manually moved up or down in relation to switch plunger 6, thus changing the setting of the temperature which it is desired to maintain constant.

The displacement of switch 1 above plunger 12 caused by cam 21 will determine the temperature range over which the proportioning action takes place. Moving motor 13 and cam 21 toward the switch by means of slots 18 and 19 will decrease this range; while moving the motor and cam away from the switch will increase the range. The initial temperature range is determined by the displacement cut into the cam.

The relationship between the proportion of the cycle during which the switch contacts are closed and the temperature may be made linear or non-linear, depending upon the way cam 21 is cut. The length of the timing cycle may be changed by changing the speed at which the cam rotates, or by cutting more than one cycle into the cam.

Having thus described my invention, I claim:

1. A device for controlling temperature comprising in combination a thermostat, adjustment means on said thermostat to select the temperature setting, a pivotally mounted switch adapted to be operated by said thermostat, a cam follower mounted on the switch, a cam adapted to periodically bring the switch in contact with the thermostat in a predetermined cycle, means for rotating the cam, means for keeping the cam follower in contact with the cam, and adjustment means for varying the distance of the cam from the switch.

2. In a thermostatically operated device for controlling temperature the improvements comprising a pivotally mounted switch adapted to be operated by a thermostat, a cam follower mounted on said switch, a cam adapted to periodically bring the switch in contact with said thermostat, means for rotating the cam, means for keeping the cam follower in contact with the cam, and adjustment means for varying the distance of the cam from the switch.

3. A proportional-time temperature controller comprising a thermostat, adjustment means on the thermostat to select the temperature setting, a rotatably mounted switch having mechanical means thereon to bring said switch into operative relationship with said thermostat, a cam follower mounted on the body of the switch, a rotatable cam adapted to contact said cam follower and rotate the body of the switch through a predetermined angle for a predetermined proportion of the cycle of cam rotation, whereby the switch is periodically brought into and taken out of operative relationship with the thermostat, means for permanently keeping the cam follower in contact with the cam, means for rotating the cam, and means for adjusting the position of the cam relative to the switch in the plane of rotation of the switch body whereby the angle through which the switch body rotates during a cycle of operation may be varied.

References Cited in the file of this patent

UNITED STATES PATENTS

| | | |
|---|---|---|
| 2,445,021 | Clark | July 13, 1948 |
| 2,500,061 | Clark | Mar. 7, 1950 |
| 2,549,461 | Haller | Apr. 17, 1951 |